United States Patent
Yanagimachi et al.

(10) Patent No.: US 11,695,630 B2
(45) Date of Patent: Jul. 4, 2023

(54) CONTROL DEVICE, CONTROL SYSTEM, NETWORK SYSTEM, CONTROL METHOD, AND COMPUTER-READABLE MEDIUM

(71) Applicant: NEC CORPORATION, Tokyo (JP)

(72) Inventors: Shigeyuki Yanagimachi, Tokyo (JP); Akio Tajima, Tokyo (JP); Kiyo Ishii, Tsukuba (JP); Syu Namiki, Tsukuba (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/434,957

(22) PCT Filed: Feb. 28, 2020

(86) PCT No.: PCT/JP2020/008281
§ 371 (c)(1),
(2) Date: Aug. 30, 2021

(87) PCT Pub. No.: WO2020/179660
PCT Pub. Date: Sep. 10, 2020

(65) Prior Publication Data
US 2022/0173962 A1    Jun. 2, 2022

(30) Foreign Application Priority Data
Mar. 1, 2019   (JP) ................. 2019-037528

(51) Int. Cl.
*G06F 15/173* (2006.01)
*H04L 41/082* (2022.01)
(Continued)

(52) U.S. Cl.
CPC ............ *H04L 41/082* (2013.01); *H04L 41/02* (2013.01); *H04L 41/085* (2013.01); *H04L 41/0866* (2013.01); *H04L 41/12* (2013.01)

(58) Field of Classification Search
CPC ...... H04L 41/082; H04L 41/02; H04L 41/085; H04L 41/0866
(Continued)

(56) References Cited

U.S. PATENT DOCUMENTS 8,271,700 B1 * 9/2012 Annem ................. G06F 13/28
710/22
10,864,635 B2 * 12/2020 Lee ...................... B25J 9/1694
(Continued)

FOREIGN PATENT DOCUMENTS

| JP | 2004-297170 A | 10/2004 |
| WO | 2015/133175 A1 | 9/2015 |
| WO | 2018/181944 A1 | 10/2018 |

OTHER PUBLICATIONS

Fujitsu, "Fujitsu Significantly Expands Its 1FINITY Series of Optical Transmission System Equipment", Press Release, Mar. 23, 2016, 9pages.
(Continued)

Primary Examiner — Lan Dai T Truong
(74) Attorney, Agent, or Firm — Sughrue Mion, PLLC

(57) ABSTRACT

High-speed control of disaggregated network systems is implemented. A control device includes a main memory and an interface. The main memory shares management information contained in memory spaces possessed by a plurality of respective component devices connected and stores the management information as integrated management information. When the management information is to be updated, the interface transmits an update signal for updating the management information to the component devices and receives a response signal to the update signal from the component devices.

6 Claims, 12 Drawing Sheets

(51) Int. Cl.
H04L 41/02      (2022.01)
H04L 41/085     (2022.01)
H04L 41/0866    (2022.01)
H04L 41/12      (2022.01)

(58) Field of Classification Search
USPC .......................................... 709/224, 223, 227
See application file for complete search history.

(56) References Cited

U.S. PATENT DOCUMENTS

| 2015/0206269 A1* | 7/2015  | Qin ........................ G06T 1/20 |
|                  |         | 725/112                                |
| 2017/0003917 A1* | 1/2017  | Nakamori .............. G06F 3/121      |
| 2018/0052846 A1* | 2/2018  | Mochizuki ............. G06F 11/00      |
| 2019/0354429 A1* | 11/2019 | Bradshaw ........... G06F 11/1004        |
| 2021/0329768 A1* | 10/2021 | Johnson ............... H05B 47/165      |

OTHER PUBLICATIONS

International Search Report for PCT/JP2020/008281 dated Apr. 14, 2020 [PCT/ISA/210].

* cited by examiner

| IDENTIFIER | ADDRESS INFORMATION | COMMAND OR STATE | ATTRIBUTE |
|---|---|---|---|
| #01 | ADDRESS A11 | COMMAND A11 | MEMORY SPACE A1 |
| | ADDRESS A12 | STATE A12 | |
| #02 | ADDRESS A21 | COMMAND A21 | MEMORY SPACE A2 |
| | ADDRESS A22 | STATE A22 | |
| | ADDRESS A23 | COMMAND A23 | |
| | ADDRESS A24 | STATE A24 | |
| #03 | ADDRESS A31 | COMMAND A31 | MEMORY SPACE A3 |
| | ADDRESS A32 | STATE A32 | |
| ... | ... | ... | ... |
| #18 | ADDRESS C61 | COMMAND C61 | MEMORY SPACE C6 |
| | ADDRESS C62 | STATE C62 | |

CONTROL DEVICE, CONTROL SYSTEM, NETWORK SYSTEM, CONTROL METHOD, AND COMPUTER-READABLE MEDIUM

CROSS REFERENCE TO RELATED APPLICATIONS

This application is a National Stage of International Application No. PCT/JP2020/008281 filed Feb. 28, 2020, claiming priority based on Japanese Patent Application No. 2019-037528 filed Mar. 1, 2019, the entire disclosures of which are incorporated by reference herein.

TECHNICAL FIELD

The present invention relates to a control device, control system, network system, control method, and computer-readable medium.

BACKGROUND ART

A network system that performs high-speed data communication in a data center or the like includes a management system referred to as an NMS (Network Management System) or an orchestrator, and a plurality of nodes connected to the management system. In recent years, disaggregation and opening of such a network system have progressed. In such a network system, component devices such as switches and transponders that constitute part of one node may be individually controlled.

FIG. 12 is a diagram showing a network system, which is an example of a related technique. A network system 900 is an example of an opened disaggregation system. In the network system 900, an orchestrator manages a plurality of network domains. In each network domain, a control device is connected to a plurality of nodes. Each node includes component devices that have various functions. A network manager controls each control device by operating the orchestrator. The control device controls each node connected thereto according to the orchestrator's instructions.

Patent Literature 1 proposes a configuration in which a domain network identifies a combination of devices that makes communication quality at a certain level or more for an optical signal input to a controller in an optical communication system.

Non Patent Literature 1 proposes a system that provides a plurality of functions, such as a transport function, a switch function, and an access function, as separate apparatuses, correspondingly to a disaggregation configuration, and controls the apparatuses.

CITATION LIST

Patent Literature

[Patent Literature 1] International Patent Publication No. WO2018/181944

Non Patent Literature

[Non Patent Literature 1] PRESS RELEASE [searched on Feb. 20, 2019] Internet <URL: http://pr.fujitsu.com/jp/news/2016/03/23.html>

SUMMARY OF INVENTION

Technical Problem

In the network system shown in FIG. 12 and the network systems shown in Patent Literature 1 and Non Patent Literature 1, one control device provided in a domain network is supposed to control each component device connected thereto. In such a case, transactions increase at a time of controlling the system, which reduces operation speed. In that case, there arises a problem that it becomes difficult for a network protection function or the like to perform operation in accordance with a standard due to the reduction in the operation speed.

An object of the present disclosure is to provide a control device, control system, network system, control method, and control program for solving the above problem.

Solution to Problem

A control device according to an example embodiment of the present disclosure includes a main memory and an interface. The main memory shares management information contained in memory spaces possessed by a plurality of respective component devices connected, and stores the management information as integrated management information. When the management information is to be updated, the interface transmits an update signal for updating the management information to the component devices and receives a response signal to the update signal from the component devices.

A control method according to an example embodiment of the present disclosure is a method for sharing and managing management information contained in memory spaces possessed by a plurality of respective component devices connected. The control method includes a numbering step, a storing step, and an update signal transmitting step. The numbering step includes assigning unique numbers to the respective memory spaces possessed by the plurality of respective component devices connected. The storing step includes storing the management information by associating the memory spaces with the numbers. The update signal transmitting step includes transmitting an update signal for updating the management information to the component devices when the management information is to be updated.

A control program according to an example embodiment of the present disclosure causes a computer to execute a control method for sharing and managing management information contained in memory spaces possessed by a plurality of respective component devices connected. The control method includes a numbering step, a storing step, and an update signal transmitting step. The numbering step includes assigning unique numbers to the respective memory spaces possessed by the plurality of respective component devices connected. The storing step includes storing the management information by associating the memory spaces with the numbers. The update signal transmitting step includes transmitting an update signal for updating the management information to the component devices when the management information is to be updated.

Advantageous Effects of Invention

The present disclosure enables high-speed control of disaggregated network systems.

BRIEF DESCRIPTION OF THE DRAWINGS

FIG. 5 is a diagram showing an example of integrated management information.

DESCRIPTION OF EMBODIMENTS

In the following description and the drawings, there is some omission and simplification as appropriate to clarify explanation. In each of the drawings, the same elements are assigned the same reference signs and duplicate description is omitted as needed.

Example Embodiment 1

Figure 1:
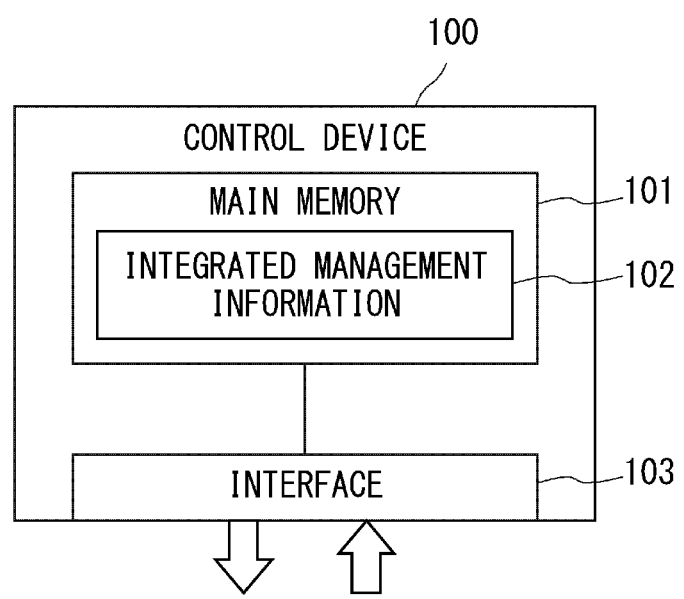
FIG. 1 is a block diagram of a control device according to an example embodiment 1.

Hereinafter, example embodiments of the present invention will be described with reference to the drawings. FIG. 1 is a block diagram of a control device according to an example embodiment 1. A control device 100 according to the example embodiment is a control device for controlling a plurality of component devices within a domain network in an optical network system. The control device 100 includes a main memory 101 and an interface 103 as main components.

The main memory 101 is a volatile storage device, such as a RAM (Random Access Memory), or a nonvolatile storage device, such as an HDD (Hard Disc Drive), an SSD (Solid State Drive), or a flash memory. The main memory 101 has stored integrated management information 102. The integrated management information 102 includes management information contained in memory spaces possessed by a plurality of respective component devices connected. That is, the control device 100 shares the management information contained in the memory spaces possessed by the plurality of respective component devices connected thereto. The main memory 101 connects to the interface 103 and supplies the information included in the integrated management information 102 to the interface 103. The main memory 101 receives information on update of the integrated management information 102 from the connected interface 103.

The interface 103 is an interface for connecting to the main memory 101 and connecting to the plurality of component devices controlled by the control device 100 to transmit and receive predetermined signals. When the management information on the component devices connected is to be updated, the interface 103 transmits an update signal to the component devices. The update signal is a signal including information for updating the management information within the memory spaces possessed by the component devices. The interface 103 receives a response signal from the component devices connected. The response signal is a signal which the component devices that have received the update signal supply to the control device 100. The response signal includes update information held by the component devices. When receiving the response signal from the component devices, the interface 103 supplies the update information included in the received response signal to the main memory 101.

By the above configuration, the control device 100 shares the integrated management information stored in its own device and the information in the memory spaces possessed by the respective component devices controlled. Consequently, when updating settings of the component devices, the control device 100 can transmit updated integrated management information to the component devices and share it. As a result, according to the above example embodiment, high-speed control of disaggregated network systems is made possible.

Example Embodiment 2

Figure 2:
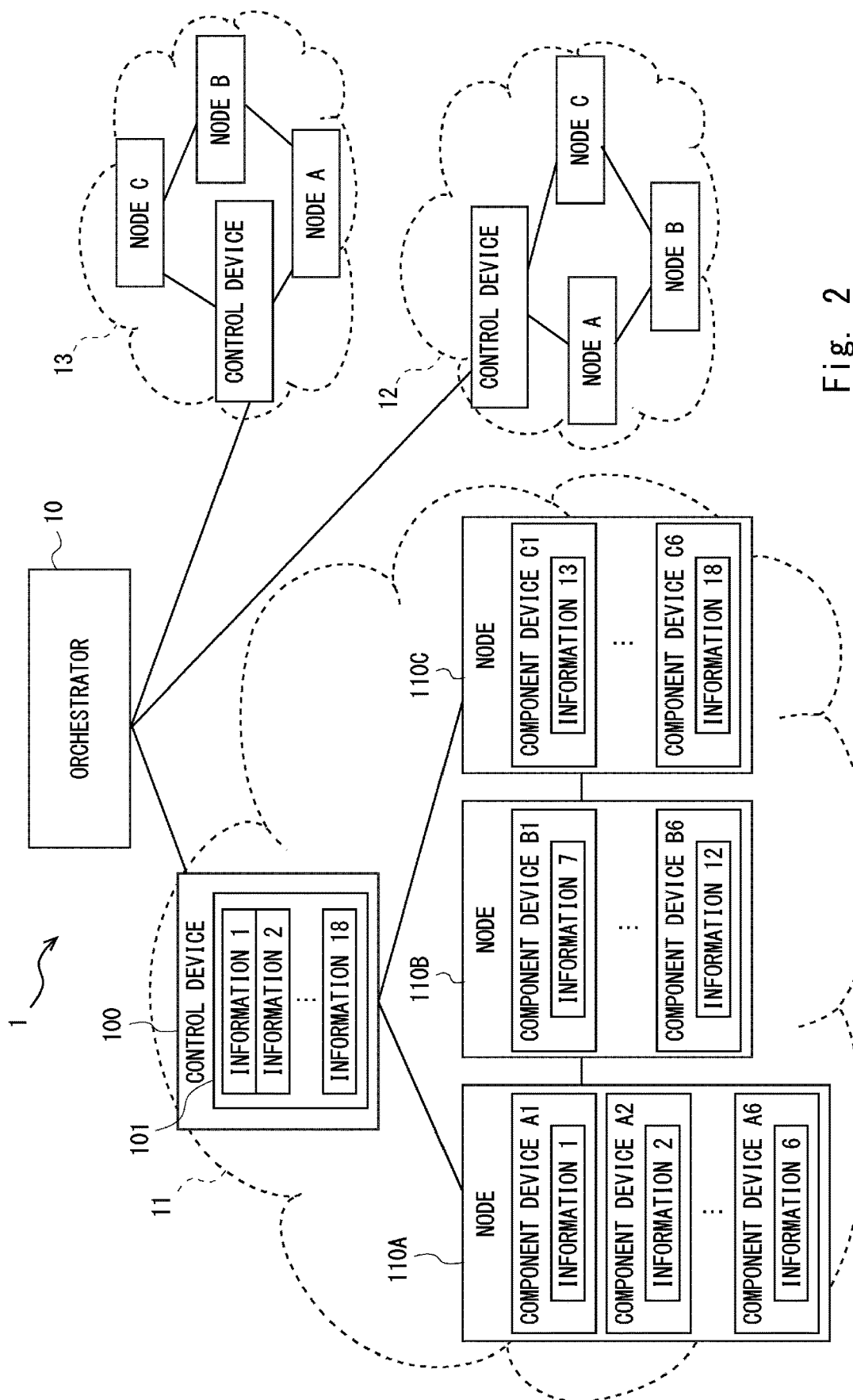
FIG. 2 is a diagram showing an outline of a network system according to an example embodiment 2.

Next, an example embodiment 2 will be described with reference to FIG. 2 and later. FIG. 2 is a diagram showing an outline of a network system according to the example embodiment 2. The network system according to the example embodiment 2 is a heterogeneous network system that forms a multi-domain network in which an orchestrator manages a plurality of domain networks.

A network system 1 shown in the figure includes an orchestrator 10 that controls control systems 11, 12, and 13, which are a plurality of domain networks. The control systems 11, 12, and 13 have equivalent configurations and functions to each other. Therefore, in the following description, the control system 11 will be described as a representative example.

The control system 11 is, for example, a data center. The control system 11 includes a control device 100, and a plurality of nodes 110A, 110B, and 110C connected to the control device 100, as main components. The nodes 110A-110C each include a plurality of component devices. Note that in the example embodiment, in order to facilitate understanding, it is assumed that the control system 11 includes the three nodes 110A-110C, and each node includes six component devices. For example, the node 110A includes component devices A1-A6. However, naturally, the number of nodes and the number of component devices are not limited to this.

The component devices are devices each of which has a predetermined function. One component device has a function of, for example, a switch, a transponder, an access, or a WDM (Wavelength Division Multiplexing). One node is an aggregate for performing a series of processes of receiving a predetermined signal, processing the received signal, and outputting a processing result, by including a plurality of these component devices. One node may be an aggregate of component devices that can be physically housed in one rack.

As shown in the figure, each component device has predetermined information. An example of the predetermined information is information for setting the function of a component device. Each component device has at least one or more pieces of such information.

In the control system 11 shown in the figure, each component device has management information. The management information is information related to a command that controls the function of the component device, or information such as a parameter indicating a state of the component device. The management information that each component device has is assigned a number. For example, the component device A1 has information 1, which is the management information, the component device A2 has information 2, and similarly, the component device C6 has information 18.

The control device 100 includes a main memory 101. The main memory 101 has information 1 to information 18, which is the same information as the information held by the component devices controlled by the control device 100. That is, the control device 100 shares the management information with each component device controlled by the control device 100. The control device 100 can manage the state of each component device by sharing the management information on each component device.

In the control system 11, the control device 100 and the component devices are daisy-chain connected. Specifically, for example, when the control device 100 transmits a predetermined signal to the node 110A, the component device A1 of the node 110A receives the signal. Next, the component device A1 transmits the signal to the component device A2, which is a next connection destination, and the component device A2 receives the signal. The signal sequentially transmitted in this way is transmitted to the component device C6 of the node 110C. Then, the component device C6 transmits the signal to the control device 100. Note that the signal transmitted along the daisy chain connection is not limited to the same contents, and after receiving the signal, each component device may update the contents and then transmit the signal to the next connection destination.

Figure 3:
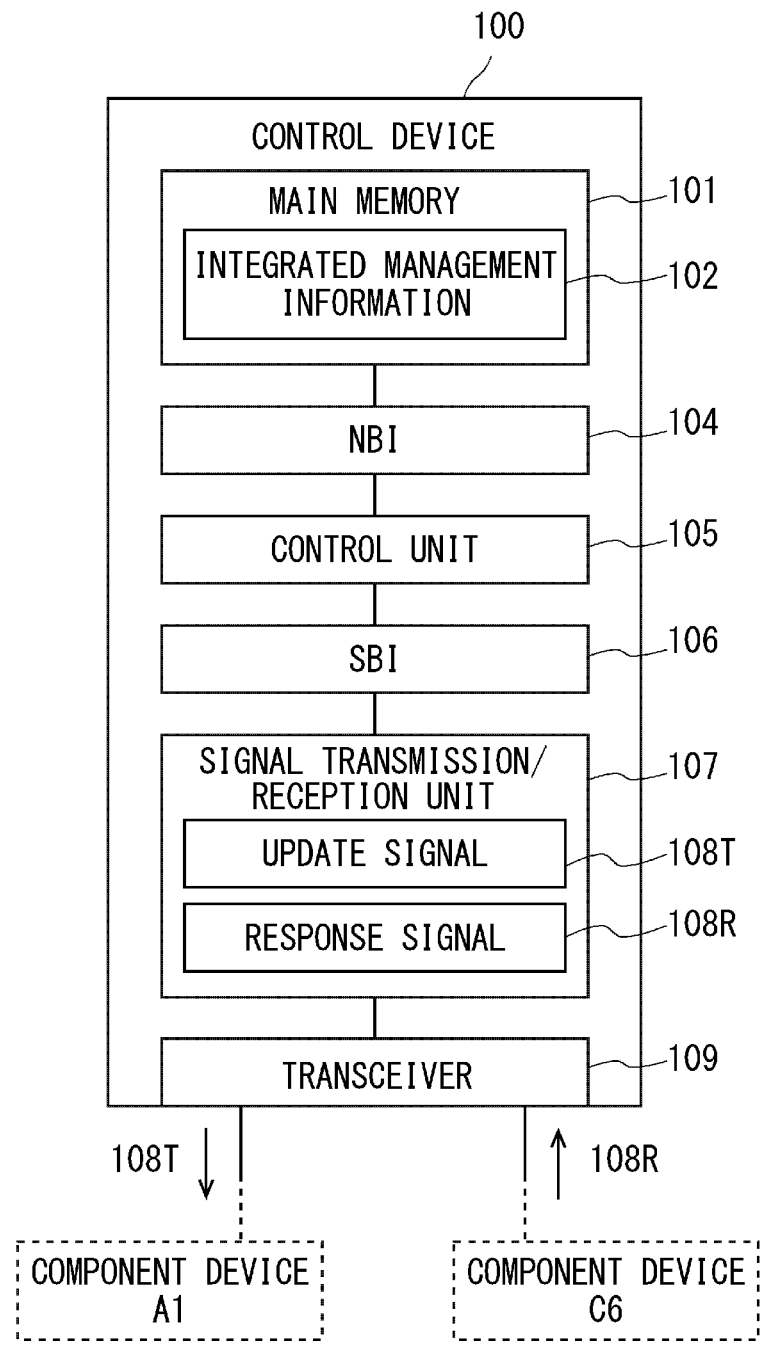
FIG. 3 is a block diagram of a control device according to the example embodiment 2.

Next, configuration of the control device 100 will be described with reference to FIG. 3. FIG. 3 is a block diagram of the control device 100 according to the example embodiment 2. The control device 100 includes the main memory 101, an NBI (Northbound Interface) 104, a control unit 105, an SBI (Southbound Interface) 106, a signal transmission/reception unit 107, and a transceiver 109.

The main memory 101 has an equivalent function to the memory according to the example embodiment 1, and has stored integrated management information 102. The integrated management information 102 includes the information 1 to the information 18 described with reference to FIG. 2. The main memory 101 has stored information each component device has and each component device that has the information, in association.

The NBI 104 is an interface for coordinating the main memory 101 and the control unit 105 to interchange each other's signal. The control unit 105 is, for example, a signal processing device, such as a CPU (Central Processing Unit). The control unit 105 receives the integrated management information 102 stored in the main memory 101 via the NBI 104, and generates an update signal 108T from the received integrated management information 102. The control unit 105 transmits the generated update signal 108T to the signal transmission/reception unit 107. The control unit 105 updates the integrated management information 102 from the update signal 108T or a response signal 108R received by the signal transmission/reception unit 107, and stores the updated integrated management information 102 in the main memory 101. The SBI 106 is an interface for coordinating the control unit 105 and the signal transmission/reception unit 107 to interchange each other's signal.

The signal transmission/reception unit 107 receives the update signal 108T from the control unit 105, and supplies the received update signal 108T to the transceiver 109. On receiving the response signal 108R from the component devices via the transceiver 109, the signal transmission/ reception unit 107 supplies the received response signal 108R to the control unit 105 via the SBI 106. Note that generating the update signal 108T is not limited to the control unit 105. For example, the control unit 105 and the signal transmission/reception unit 107 may cooperate to generate the update signal 108T. The control unit 105 may have a function of instructing the signal transmission/reception unit 107 to generate the update signal 108T, and the signal transmission/reception unit 107 may generate the update signal 108T.

The transceiver 109 is an interface that communicatively connects the control device 100 and the component devices. The transceiver 109 transmits the update signal 108T received from the signal transmission/reception unit 107 to the component device A1 and supplies the response signal 108R received from the component device C6 to the signal transmission/reception unit 107, in accordance with a preset protocol.

Figure 4:
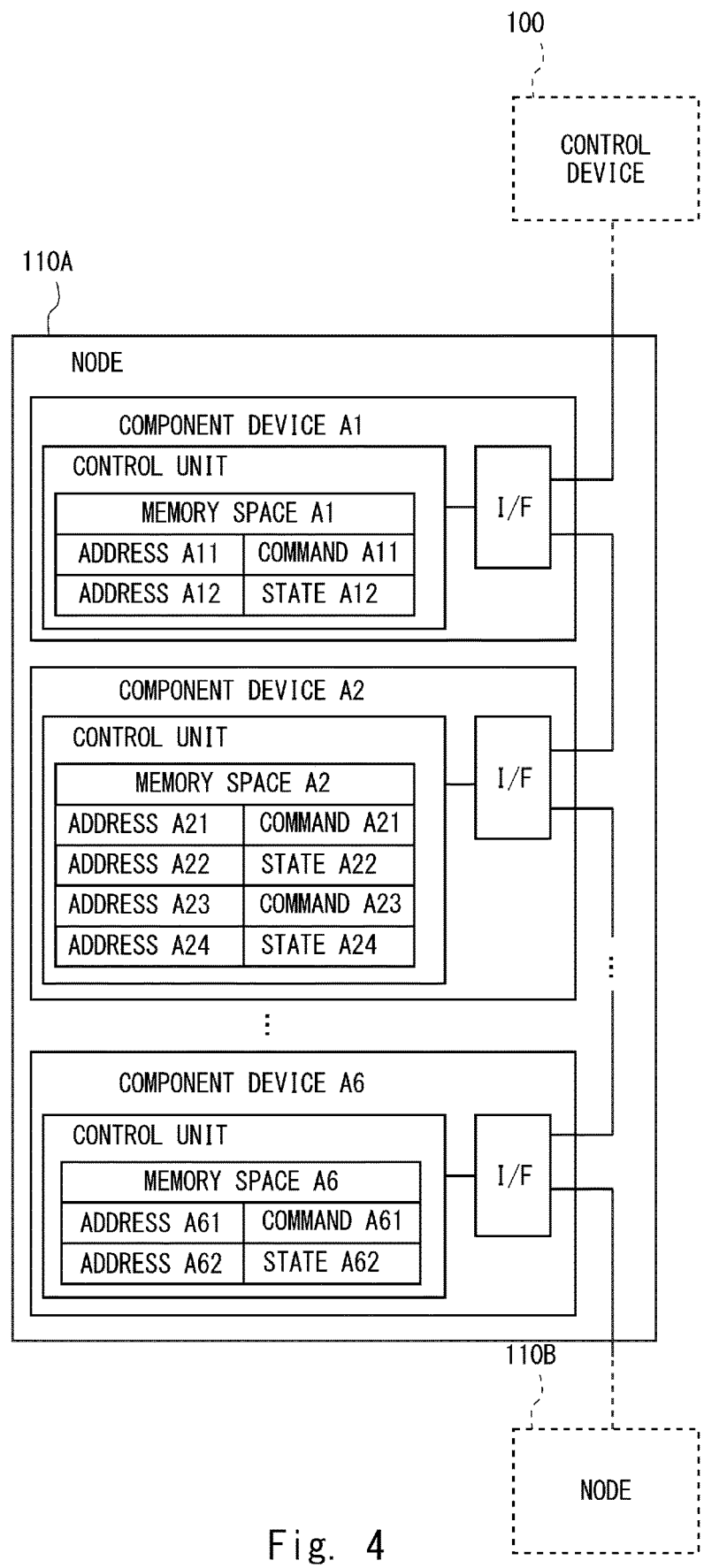
FIG. 4 is a diagram exemplifying a node configuration according to the example embodiment 2.

Next, configurations of the nodes and the component devices will be described with reference to FIG. 4. FIG. 4 is a diagram exemplifying a node configuration according to the example embodiment 2. The node 110A shown in the figure includes the component devices A1-A6, which are devices each of which has a predetermined function.

The component device A1 at least includes a control unit and an I/F (Interface). The component device A1 is connected to the control device 100 and the component device A2 via the I/F. The control unit of the component device A1 is, for example, an MPU (Micro Processing Unit). The control unit has a memory space A1. In the memory space A1, management information, which is a plurality of commands and parameters related to the function which the component device A1 has, is stored.

Specifically, for example, in the memory space A1 of the component device A1, an address A11 is registered, and in a register corresponding to the address A11, a command A11 is stored. Similarly, in the memory space A1, an address A12 is registered, and in a register corresponding to the address A12, a state A12 is stored.

The component device A1 has a function of updating a command A1 and a state A1 according to contents of a received update signal on receiving the update signal from the control device 100. On updating the command A11 and state A12, the component device A1 supplies the update signal to the component device A2 via the I/F.

The component device A2 also has a similar function and configuration to the component device A1. In a memory space A2 possessed by the component device A2, a command A21 corresponding to an address A21, a state A22 corresponding to an address A22, a command A23 corresponding to an address A23, and a state A24 corresponding to an address A24 are stored. In this way, the component devices may have multiple pieces of management information in each memory space. On receiving the update signal from the component device A1, the component device A2 updates the command A21, state A22, command A23, and state A24 according to contents of the received update signal, and transmits the update signal to the next connection destination. The other component devices have similar functions and configurations to the above component devices A1 and A2.

Next, the integrated management information which the control device 100 has will be described with reference to FIG. 5. FIG. 5 is a diagram showing an example of the integrated management information. FIG. 5 shows the integrated management information 102 as a table. In the integrated management information 102 shown in the figure, two-digit identifiers #01 to #18 are shown in a left column. On the right side of the identifiers, address information A11 to C62 corresponding to the respective identifiers is shown. The address information A11 to C62 is address information of the management information held by the component devices to which the control device 100 connects.

On the right side of the address information, a command or state corresponding to each piece of address information is shown. On the right side of the command or state, an attribute is shown. The attribute in the example embodiment is information indicating which memory space each piece of managed information is included in. For example, about the identifier #01, as information contained in the memory space A1, the command A11 corresponding to the address A11 and the state A12 corresponding to the address A12 are stored in association. About the identifier #02, as information contained in the memory space A2, the command A21 corresponding to the address A21, the state A22 corresponding to the address A22, the command A23 corresponding to the address A23, and the state A24 corresponding to the address A24 are stored. In the integrated management information 102, as described above, the management information in the memory spaces possessed by the respective component devices is shared and stored.

Figure 6:
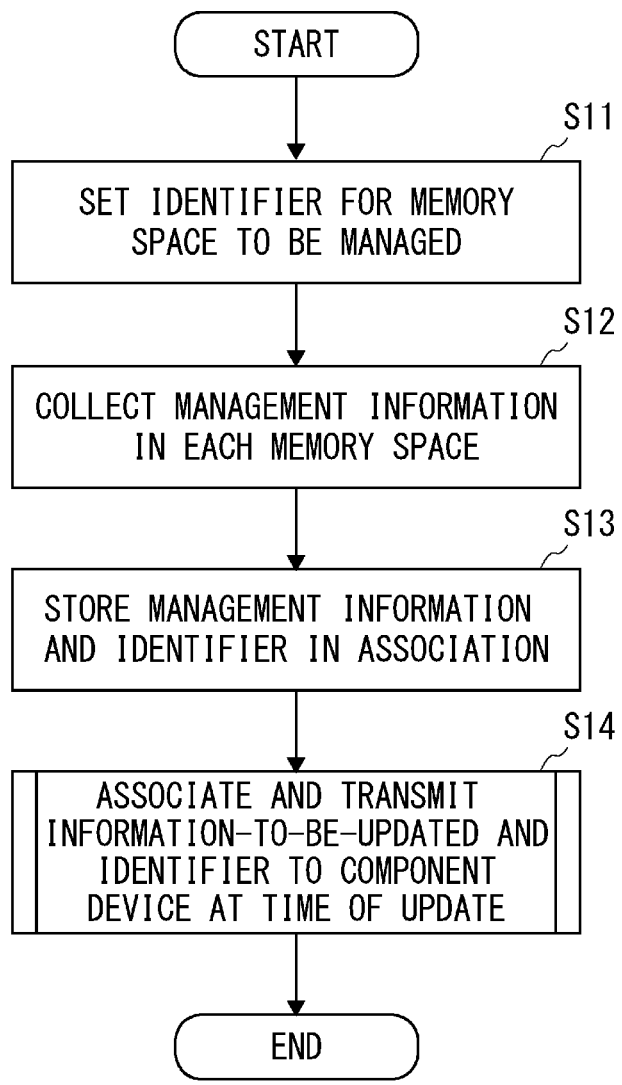
FIG. 6 is a flowchart showing processing for the control device to create the integrated management information.

Next, processing of generating and updating the integrated management information 102 of the control device 100 will be described with reference to FIG. 6. FIG. 6 is a flowchart showing processing for the control device to create the integrated management information. The following flowchart will be described as processing which a manager who manages the control device 100 performs.

First, the manager of the control device 100 sets identifiers for the memory spaces to be managed of the component devices connected to the control device 100 (step S11). Next, the manager collects the management information in the memory spaces (step S12). Next, the manager causes the main memory 101 to store the management information in association with the identifiers (step S13). Next, when the management information is to be updated, the manager transmits a signal associating information to be updated with identifiers as an update signal for updating the management information to the component devices (step S14).

Through such processing, the control device 100 manages the collected management information in an integrated manner, and when updating the management information, transmits information associated with the identifiers to allow the management information on the component devices to be updated. Note that the above description is made on the assumption that the manager performs the processing, but the processing may be performed by a program stored in a computer.

Figure 7:
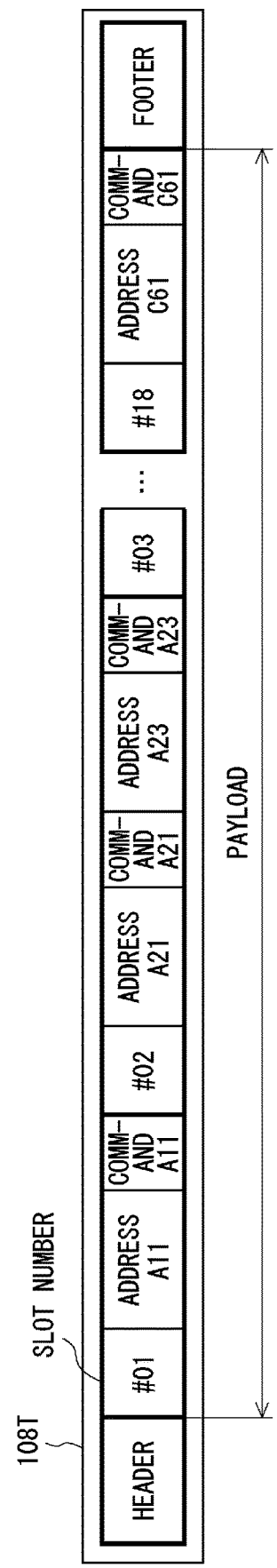
FIG. 7 is a diagram showing a first example of an update signal generated by the control device.

Next, the update signal will be described with reference to FIG. 7. FIG. 7 is a diagram showing a first example of the update signal 108T generated by the control device 100. The control device 100 generates the update signal 108T from the integrated management information 102 shown in FIG. 5. The update signal 108T shown in FIG. 7 is generated to update management information on commands held by the component devices connected to the control device 100. FIG. 7 shows a frame format of the update signal 108T. When the control device 100 transmits the update signal 108T, each piece of information is transmitted from the left to the right in the figure. The update signal 108T is formed in order of header, payload, and footer from the left side. That is, the control device 100 transmits the signal in order of header, payload, and footer.

The update signal 108T shown in the example embodiment constitutes a time-division multiplex signal. That is, the update signal 108T is constructed so that signals for a plurality of different memory spaces are arranged along a time during which the signals are transmitted and received and the arranged signals are treated as one signal.

The header includes information or the like indicating a preamble and data length for synchronizing with a reception side. The payload includes slot numbers, address signals, and command signals. The slot numbers are identification numbers uniquely assigned to the respective addresses of the memory spaces included in the payload. Note that, in the example embodiment, the slot numbers match the identifiers of the integrated management information. The signals in the payload are constructed correspondingly to the slot numbers, and regarding one slot number, signals related to one memory space of the component devices and an address and a command corresponding to the memory space are included. For example, in the payload, following the slot number #01, the address A11 and command A11 in the memory space A1 possessed by the component device A1 are included. Following the slot number #02, the address A21, command A21, address A23, and command A23 in the memory space A2 possessed by the component device A2 are included. Similarly, in the payload, following the slot number #18, the address A61 and command C61 of the component device C6 are included. The payload ends here, and in the update signal 108T, the footer is constructed subsequently.

The footer includes an EOF (End Of Frame) signal indicating that the signal ends, and the like. The footer may include an error message. The error message may include information on the identifier of the memory space possessed by a component device, for example, when the update of the management information is failed in the component device. The footer may include a signal indicating the update is completed without any error.

In this way, the control device 100 generates, as the update signal 108T, an update signal including commands to update the settings for the respective component devices. The control device 100 generates the time-division multiplexed update signal to transmit it to the component devices, as described above. As a result, the control device 100 can easily adapt the configuration of the update signal even when the number of component devices included in the control system 11 increases or decreases.

Note that the slot numbers included in the update signal do not have to be the same as the identifiers included in the main memory 101. The slot numbers allow each component device to recognize information corresponding to its own memory space. Therefore, when each component device recognizes which number of the payload includes information corresponding to its own memory space, the slot numbers may be flags or the like meaning start of each signal in place of the specific identification numbers.

Figure 8:
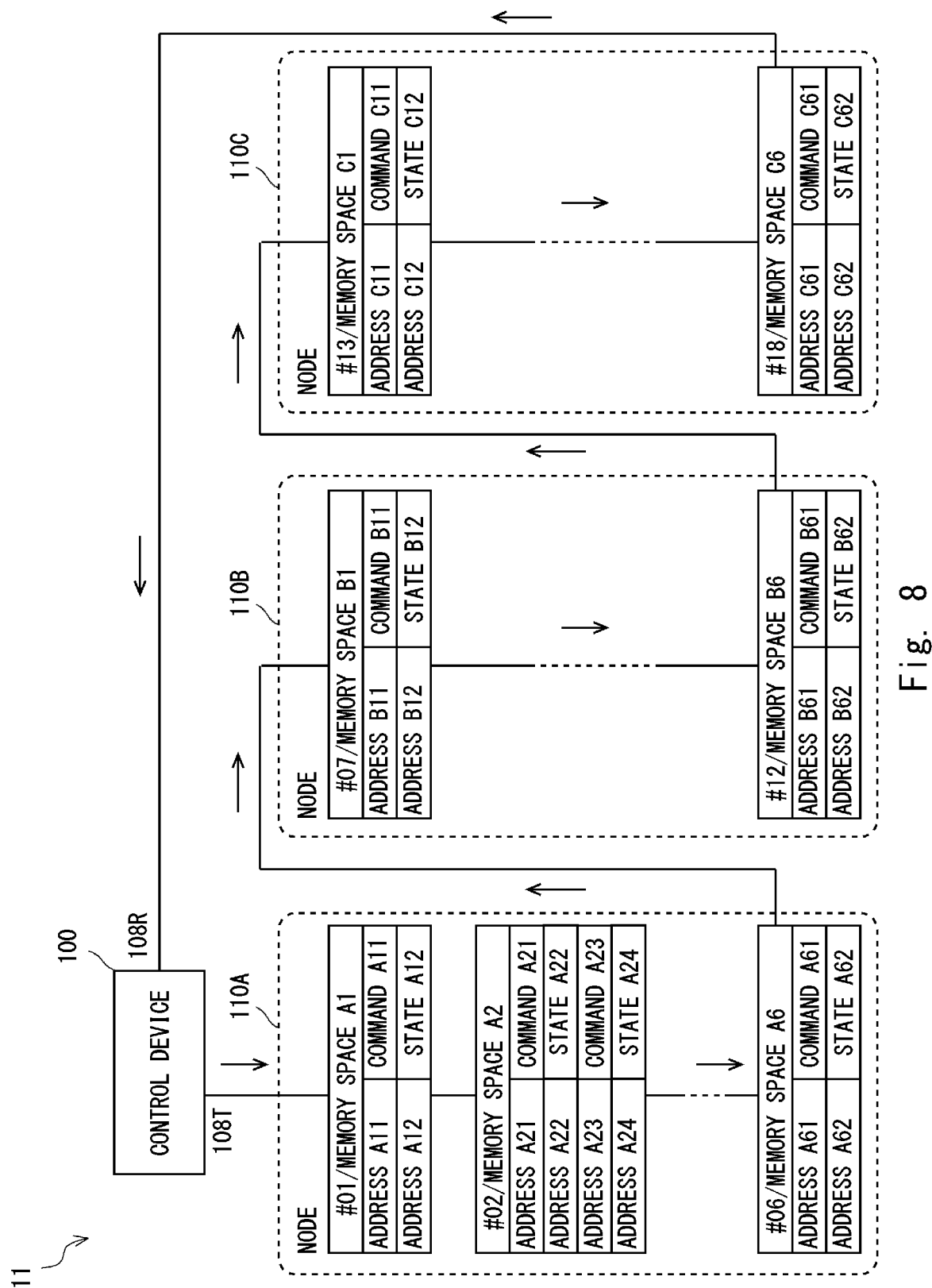
FIG. 8 is a diagram showing a flow of an update signal of a control system according to the example embodiment 2.

Next, a flow of the update signal in the control system 11 will be described with reference to FIG. 8. FIG. 8 is a diagram showing a flow of an update signal of the control system according to the example embodiment 2. FIG. 8 schematically shows transmission and reception of signals in the daisy-chain connected control system 11. Therefore, FIG. 8 shows a hardware configuration in a state of being omitted as appropriate.

As shown in the figure, in the control system 11, the control device 100 transmits the update signal 108T to the node 110A. In the node 110A, the update signal 108T transmitted from the control device 100 is transmitted to the memory space A1 of the identifier #01. After update processing in the memory space A1 is performed, the update signal 108T is transmitted to the memory space A2 of the identifier #02, and update processing in the memory space A2 is performed. In this way, the node 110A sequentially performs update processing in the memory spaces. Then, when update processing in the memory space A6 ends, the update signal is transmitted to the node 110B.

When receiving the update signal, the node 110B updates the signal corresponding to each identifier according to connection order, and on finishing update processing in the memory space B6 of the identifier #12, transmits the update signal to the node 110C. Similarly, when receiving the update signal from the node 110B, the node 110C updates the signal corresponding to each identifier according to connection order, and on finishing update processing in the memory space C6 of the identifier #18, transmits the signal to the control device 100, which is the next connection destination. The control device 100 receives the signal as the response signal 108R from the node 110C. The response signal 108R includes a history of the update processing performed by the component devices.

As described above, the control system 11 implements the update processing in the memory spaces possessed by the daisy-chain connected components by transmitting and receiving one update signal. The control system 11 can update the integrated management information according to the response signal by the configuration of daisy-chain connection.

Figure 9:
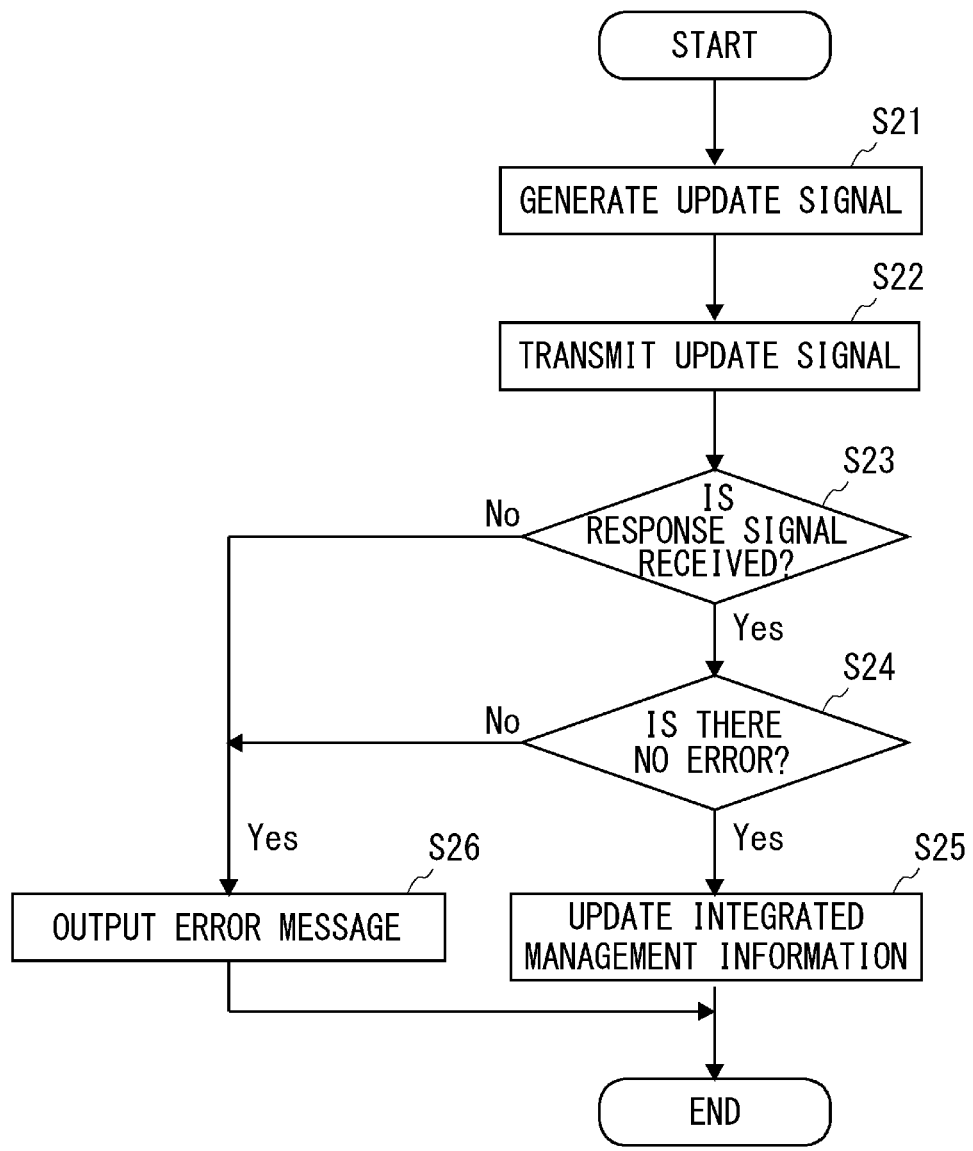
FIG. 9 is a flowchart showing processing for the control device to update the integrated management information.

Next, update processing performed by the control device 100 will be described with reference to FIG. 9. FIG. 9 is a flowchart showing processing for the control device to update the integrated management information. The flowchart shown in FIG. 9 is processing when the update processing is performed in step S14 in the flowchart of FIG. 6.

First, the control unit 105 generates an update signal when predetermined update information is received (step S21). Specifically, the control unit 105 reads the integrated management information stored in the main memory 101, and develops the read information into the update signal shown in FIG. 7. At this time, the control unit 105 reflects the update information received in advance in the update signal. For example, when information on the command held by the component device A1 of the node 110A is to be updated, it is necessary to update the command A11 in the memory space A1 shown in FIG. 5. In that case, the control unit 105 rewrites the command A11 of the slot number #01 shown in FIG. 7 with new information. The control unit 105 supplies the generated update signal 108T to the signal transmission/reception unit 107.

Next, the signal transmission/reception unit 107 transmits the generated update signal 108T to the component devices via the transceiver 109 (step S22). When the update signal 108T is transmitted to the component device A1, it is sequentially transmitted to each component device, as described with reference to FIG. 8.

Next, the control unit 105 determines whether the response signal 108R is received within a predetermined time (step S23). When the response signal 108R cannot be received within the predetermined time (step S23: No), the control unit 105 outputs an error message (step S26). The control unit 105 finishes processing on outputting the predetermined error message.

On the other hand, when the response signal 108R is received within the predetermined time (step S23: Yes), the control unit 105 determines whether the response signal 108R includes an error message (step S24).

When the response signal 108R includes an error message in step S24, the control unit 105 does not determine that there is no error (step S24: No), outputs an error message (step S26), and finishes the processing.

On the other hand, when the response signal 108R does not include an error message, the control unit 105 determines that there is no error (step S24: Yes), and proceeds to step S25. In this case, the control unit 105 updates the integrated management information (step S25). That is, the control unit 105 reflects update contents corresponding to contents of the generated update signal 108T, in the integrated management information 102 in the main memory 101. For example, when updating information on the command held by the component device A1 of the node 110A, the control unit 105 updates the command A11 corresponding to the identifier #01 in the main memory 101. The control unit 105 finishes the processing after updating the integrated management information in this way.

As described above, the control device 100 generates the update signal from the acquired update information, and transmits the generated update signal to the component devices. By transmitting the update signal to the component devices, the control device 100 updates the management information on the controlled component devices. Then, according to the response signal received from the component devices, the control device 100 updates the integrated management information managed by itself. By performing such processing, the control device 100 manages the management information held by component devices.

Figure 10:
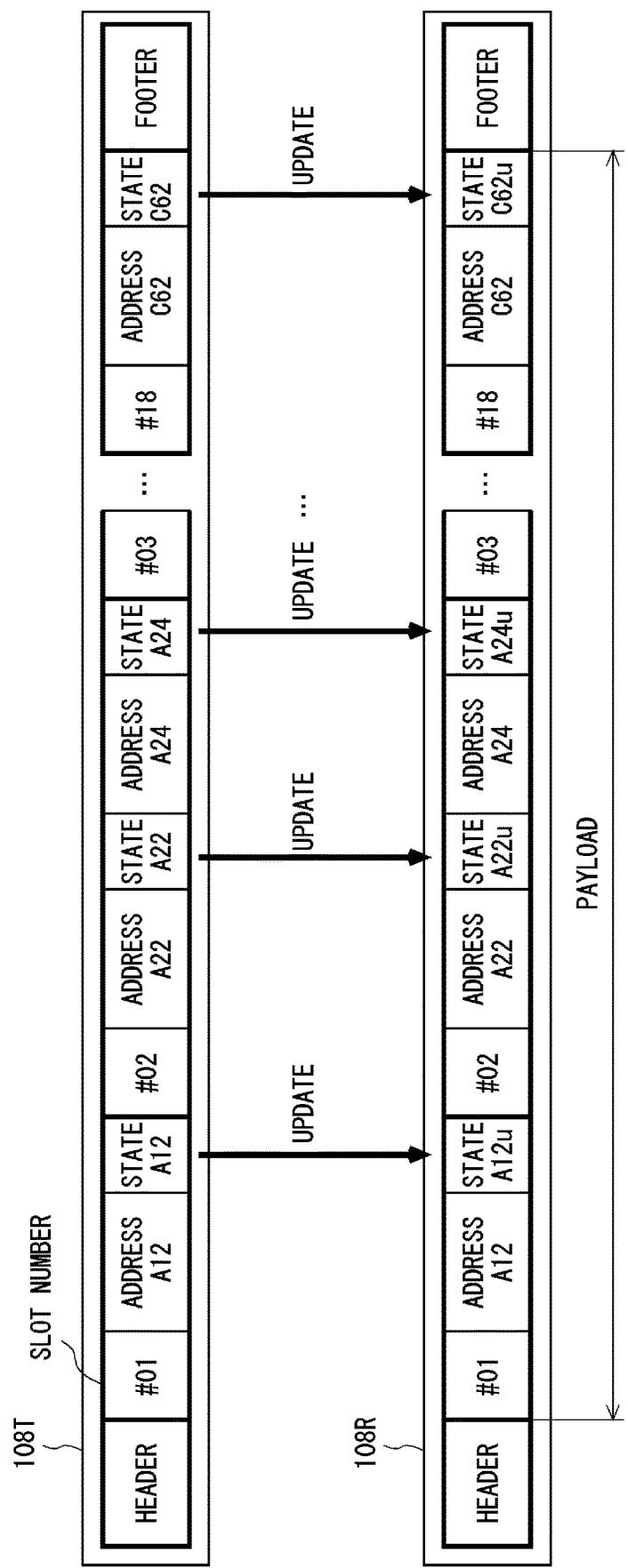
FIG. 10 is a diagram showing a second example of the update signal transmitted by the control device.

Next, variations of the update signal will be described with reference to FIGS. 10 and 11. FIG. 10 is a diagram showing a second example of the update signal transmitted by the control device. An upper side of FIG. 10 is the update signal 108T according to the second example. A lower side of FIG. 10 is the response signal 108R according to the second example. The update signal 108T and response signal 108R shown in FIG. 10 are different from the update signal shown in FIG. 7 in contents of the payload.

The update signal 108T shown in FIG. 10 is generated to update management information on the states of the respective component devices connected to the control device 100. The payload of the update signal 108T shown in FIG. 10 includes slot numbers, address signals, and state signals. When receiving the update signal, each component device overwrites the state signal corresponding to a relevant address of the update signal 108T so that the state signal is the same as a state signal held by itself. Then, each component device transmits the overwritten update signal 108T to the next connection destination.

For example, the component device A1 receives the update signal 108T, overwrites the state A12 corresponding to the address A12 with a state A12u, and transmits the overwritten update signal to the next connection destination. In this way, each component device sequentially overwrites the state signal with a signal indicating the latest state.

That is, the control device 100 generates the update signal including commands to collect the states of the respective component devices. Then, each component device overwrites a corresponding state signal of the received update signal 108T. Thereby, the control device 100 receives the response signal 108R in which the state of each component device is updated. In this case, the control device 100 reflects the contents of the response signal 108R, in the integrated management information 102 in the main memory 101.

Figure 11:
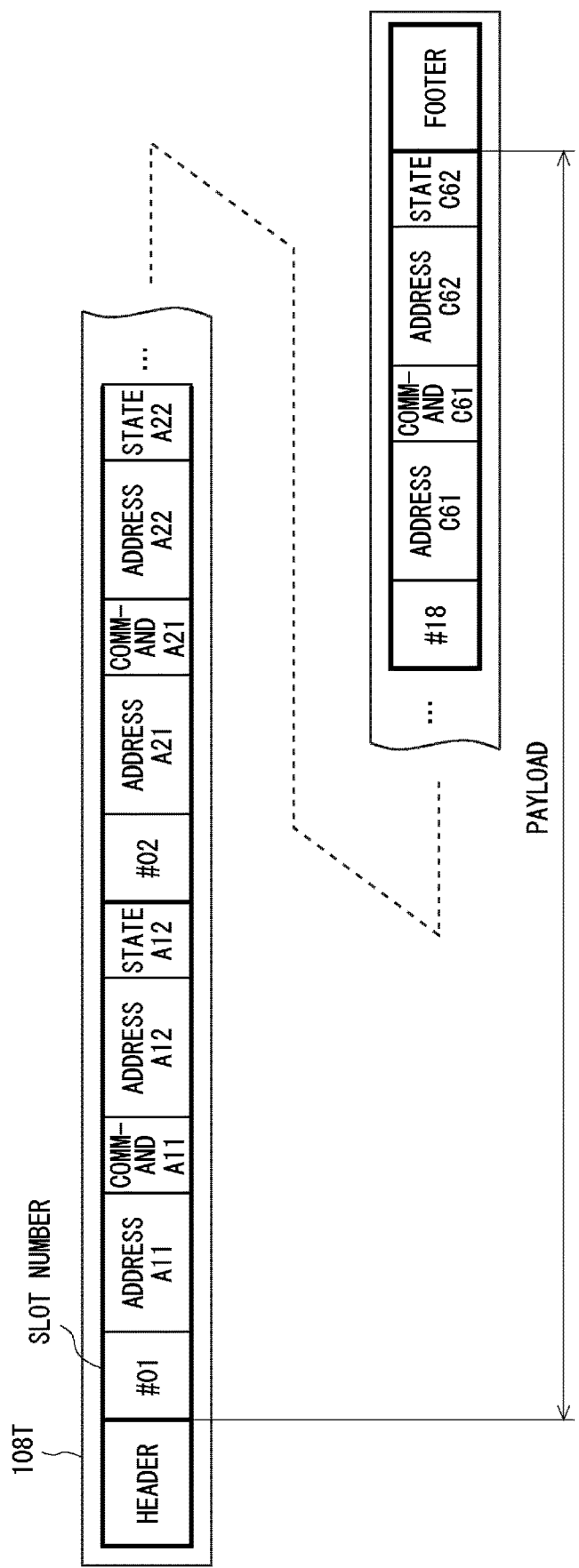
FIG. 11 is a diagram showing a third example of the update signal transmitted by the control device.
Figure 12:
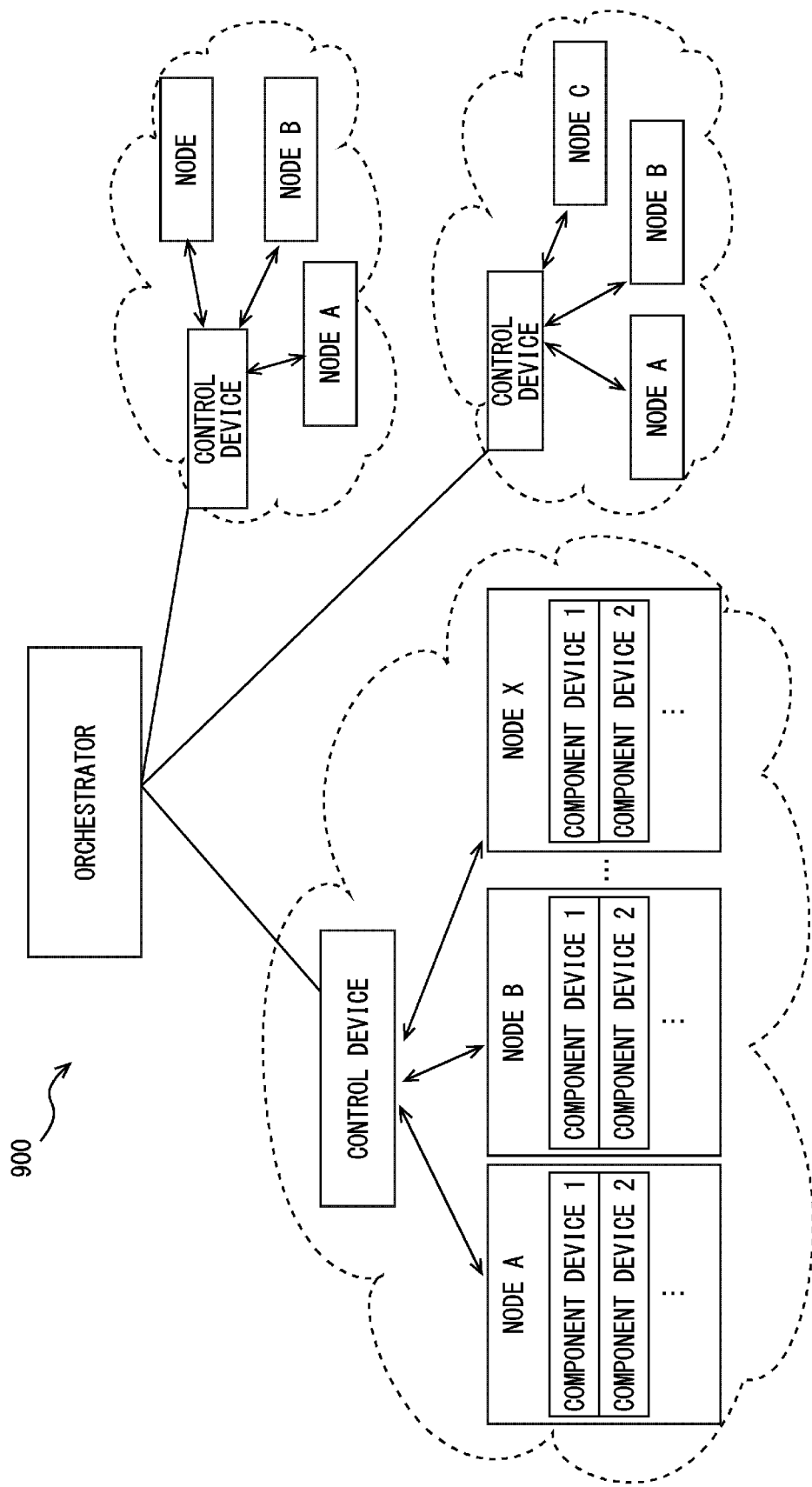
FIG. 12 is a diagram showing a network system, which is an example of a related technique.

FIG. 11 is a diagram showing a third example of the update signal transmitted by the control device. The update signal 108T shown in FIG. 11 is generated to update management information on the commands and management information on the states, held by the respective component devices connected to the control device 100. For example, in the update signal 108T of FIG. 11, following the slot number #01, the address A11, command A11, address A12, and state A12 are formed. The component device A1 that has received the update signal 108T updates the command A11 in the memory space A1. Then, the component device A1 overwrites the signal A12 related to the state corresponding to the address A12 of the update signal with the latest state A12 stored within its own memory space.

As described above, as the update signal 108T, the control device 100 related to the third example generates an update signal including the commands to update settings for the respective component devices and also generates an update signal including the commands to collect the states of the respective component devices. Consequently, the control device 100 can update the management information on the controlled component devices by transmitting the update signal once and receiving the response signal accompanied by the transmission. The control device 100 can share the management information on the controlled component devices.

The Example embodiment 2 has been described above. The control device 100 according to the example embodiment can update the memory space of each component device by transmitting the update signal to the plurality of component devices once. In the control system 11 according to the example embodiment, the control device 100 can share and integrally manage the management information stored in the memory space of each component device. Therefore, according to the example embodiment, high-speed control of the disaggregated network systems is made possible.

Note that the above program can be stored using various types of non-transitory computer-readable media and supplied to the computer. The non-transitory computer-readable media include various types of tangible recording media. Examples of the non-transitory computer-readable media include magnetic recording media (for example, flexible disk, magnetic tape, and hard disk drive), magneto-optical recording media (for example, magneto-optical disk), a CD-ROM (Read Only Memory), a CD-R, a CD-R/W, semiconductor memories (for example, mask ROM, PROM (Programmable ROM), EPROM (Erasable PROM), flash ROM, and RAM). The program may be supplied to the computer by various types of transitory computer-readable media. Examples of the transitory computer-readable media include an electric signal, an optical signal, and an electromagnetic wave. The transitory computer-readable media can supply the program to the computer via a wired communication path, such as an electric wire and an optical fiber, or a wireless communication path.

Although the invention of the present application has been described above with reference to the example embodiments, the invention of the present application is not limited by the above. Various changes that can be understood by those skilled in the art can be made within the scope of the invention for the configurations and details of the invention of the present application.

This application is based upon and claims the benefit of priority from Japanese patent application No. 2019-037528, filed on Mar. 1, 2019, the disclosure of which is incorporated herein in its entirety.

REFERENCE SIGNS LIST

1 NETWORK SYSTEM
10 ORCHESTRATOR
11, 12, 13 CONTROL SYSTEM
100 CONTROL DEVICE
101 MAIN MEMORY
102 INTEGRATED MANAGEMENT INFORMATION
103 INTERFACE
104 NBI
105 CONTROL UNIT
106 SBI
107 SIGNAL TRANSMISSION/RECEPTION UNIT
108R RESPONSE SIGNAL
108T UPDATE SIGNAL
109 TRANSCEIVER
110A, 110B, 110C NODE
A1-A6, B1-B6, C1-C6 COMPONENT DEVICE

The invention claimed is:

1. A control method comprising:
setting identifiers for respective memory spaces possessed by a plurality of respective component devices connected in order to share and manage management information contained in the memory spaces;
storing the management information by associating the memory spaces with the identifiers; and
transmitting an update signal for updating the management information to the component devices when the management information is to be updated,
wherein:
a control device transmits the update signal to one memory space of a first one of the plurality of the component devices,
the first one of the plurality of component devices performs update processing of the memory space and transmits the update signal to a memory space of a next component device, which is a next connection destination, and the connected component devices sequentially repeat update processing of the memory spaces in connection order, and
the control device receives a response signal from a last component device.

2. A non-transitory computer-readable medium having stored therein a control program configured to cause a computer to perform a control method according to claim 1.

3. A control device comprising:
a main memory configured to share management information contained in memory spaces possessed by a plurality of respective component devices connected and store the shared management information as integrated management information; and
an interface configured to transmit an update signal for updating the management information to the component devices and receive a response signal, responsive to the update signal, from the component devices, when the management information is to be updated,
wherein:
the control device transmits the update signal to one memory space of a first one of the plurality of component devices,
the first one of the plurality of component devices performs update processing of the memory space and transmits the update signal to a memory space of a next component device, which is a next connection destination, and connected component devices sequentially repeat update processing of the memory spaces in connection order, and the control device receives a response signal from a last component device.

4. A control system comprising:
the control device according to claim 3; and
the plurality of component devices connected to the control device.

5. A control method comprising:
setting identifiers for respective memory spaces possessed by a plurality of respective component devices connected in order to share and manage management information contained in the memory spaces;
storing the management information by associating the memory spaces with the identifiers; and
transmitting an update signal for updating the management information to the component devices when the management information is to be updated,
wherein:
a control unit generates the update signal,
a signal transmission/reception unit transmits the update signal to the component devices via a transceiver,
the control unit determines whether a response signal is received within a predetermined time,
when the response signal is received within the predetermined time, the control unit determines whether the response signal includes an error message, and
when the response signal does not include the error message, the control unit updates integrated management information.

6. A non-transitory computer-readable medium having stored therein a control program configured to cause a computer to perform a control method according to claim 5.

* * * * *